United States Patent [19]
Choi

[11] Patent Number: 5,986,829
[45] Date of Patent: Nov. 16, 1999

[54] DIGITAL RECORDING AND REPRODUCING APPARATUS FOR HIGH-SPEED COPYING OF TAPE

[75] Inventor: Kyung-Hwan Choi, Suwon, Rep. of Korea

[73] Assignee: Samsung Electronics Co., Ltd., Kyungki-do, Rep. of Korea

[21] Appl. No.: 08/756,249

[22] Filed: Nov. 25, 1996

[30] Foreign Application Priority Data

Nov. 23, 1995 [KR] Rep. of Korea ........................ 95-43207

[51] Int. Cl.⁶ ......................................................... G11B 5/86
[52] U.S. Cl. ................................................. 360/15; 360/64
[58] Field of Search .......................... 360/15, 64; 386/40, 386/124, 109

[56] References Cited

U.S. PATENT DOCUMENTS

| | | | |
|---|---|---|---|
| 4,866,543 | 9/1989 | Cooper et al. | 360/15 |
| 4,888,653 | 12/1989 | Cullum | 360/15 |
| 5,083,225 | 1/1992 | Morisaki et al. | 360/64 |
| 5,337,199 | 8/1994 | Arai et al. | 360/15 X |

FOREIGN PATENT DOCUMENTS

| | | | |
|---|---|---|---|
| 0 653 745 | 5/1995 | European Pat. Off. | G11B 5/008 |
| 0 653 746 | 5/1995 | European Pat. Off. | G11B 5/008 |
| 8315308 | 11/1996 | Japan . | |

*Primary Examiner*—Andrew L. Sniezek
*Attorney, Agent, or Firm*—Sughrue, Mion, Zinn, Macpeak & Seas, PLLC

[57] ABSTRACT

A high speed digital recording and reproducing apparatus fo duplicating of a tape at a speed N-times faster than a speed for a normal speed duplication. The apparatus includes a recording head drum and a reproduction head drum having N-times a diameter and 1/N-times a surrounding angle compared with those of the normal speed duplication, 2N reproduction heads and recording heads which are disposed on the head drums, respectively, a signal processor for processing signals transmitted from the reproduction heads to match the high-speed duplication and supplying the processed signals to said recording heads, and a controller for transferring the source tape and target tape at N-times the normal speed, and controlling the head drums to rotate at the rate which meets the condition: N×(drum diameter at the normal speed)/(drum diameter at N-times high-speed duplication)×(the number of rotation in case of the normal speed). Thus, duplication time and power consumption can be reduced while duplicating multiple tapes.

3 Claims, 20 Drawing Sheets

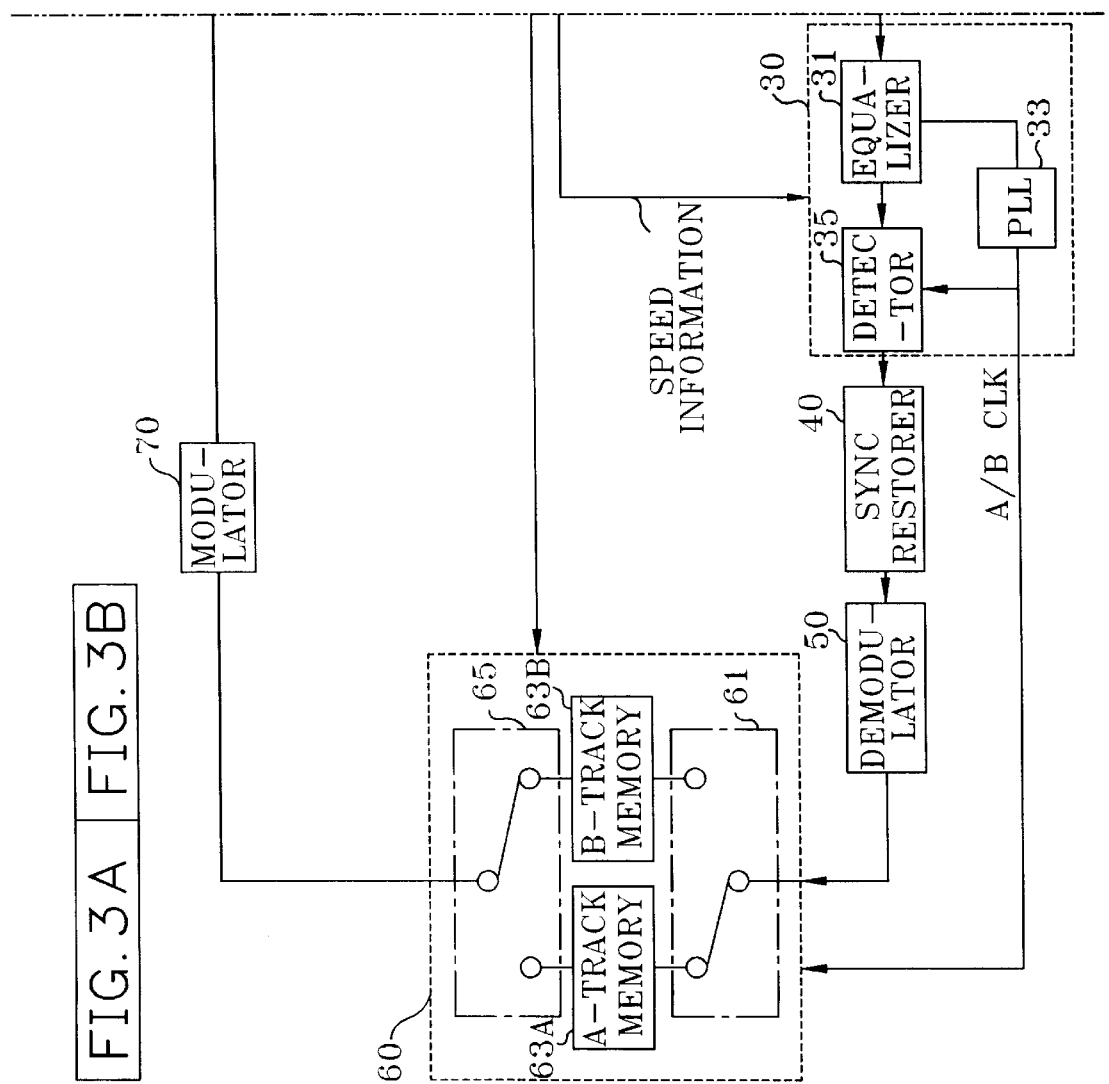

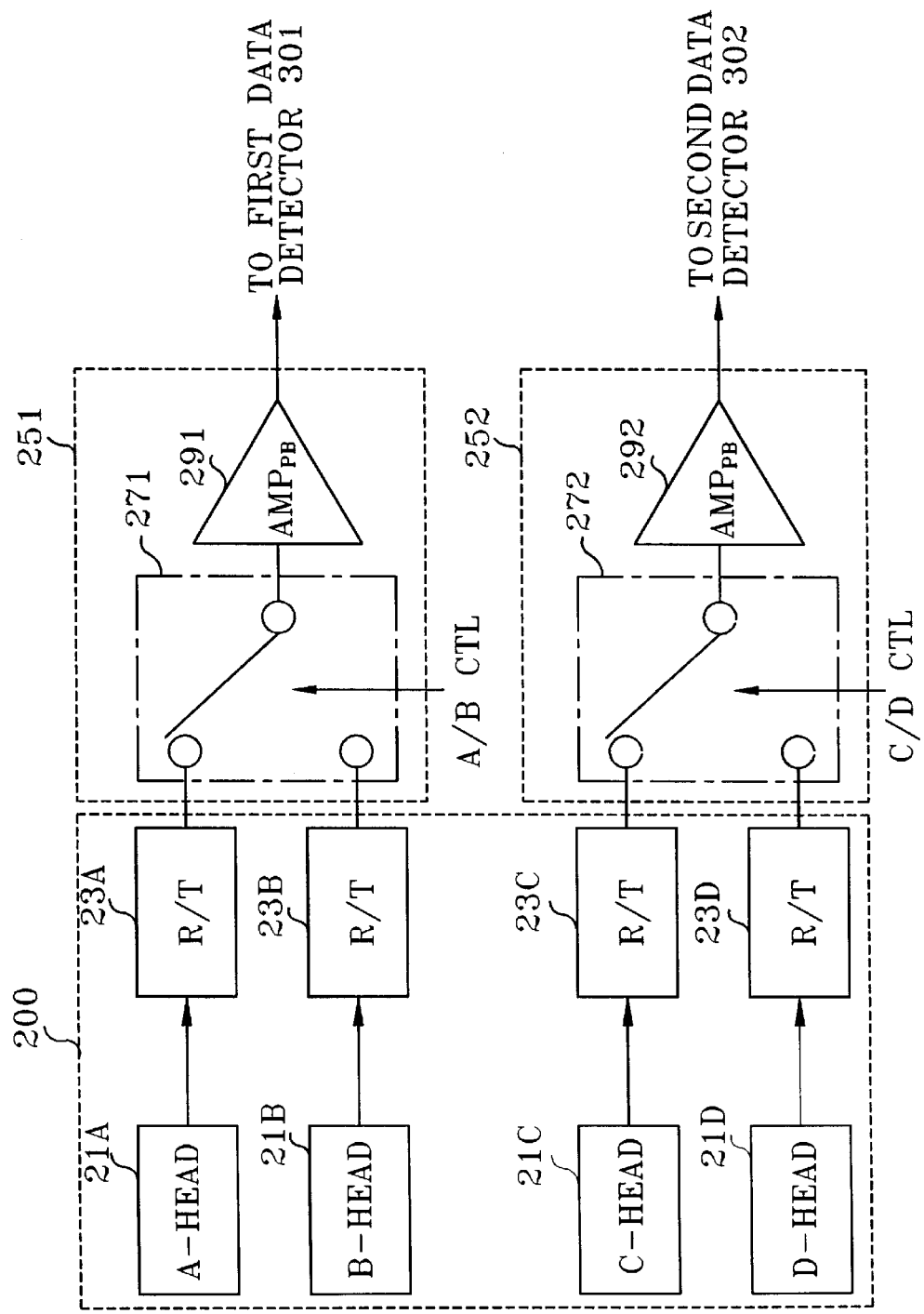

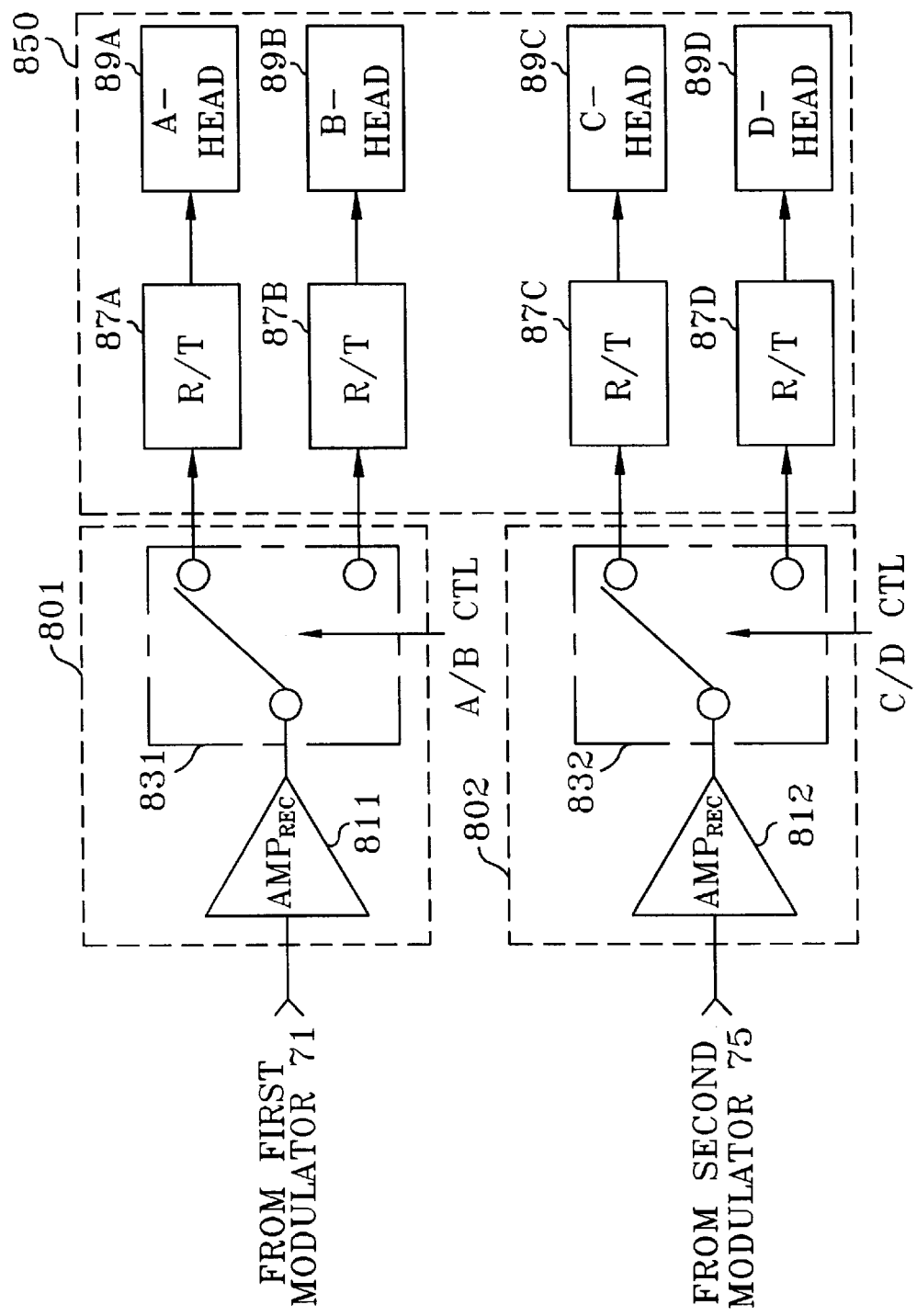

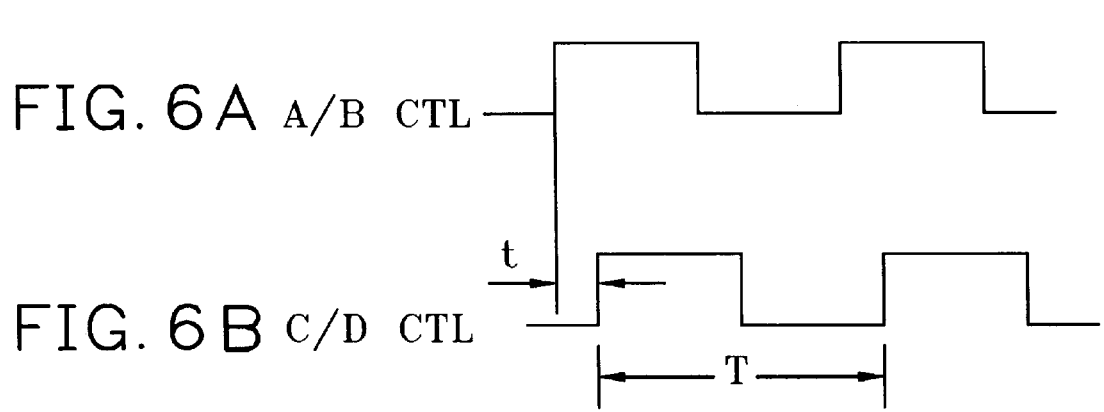

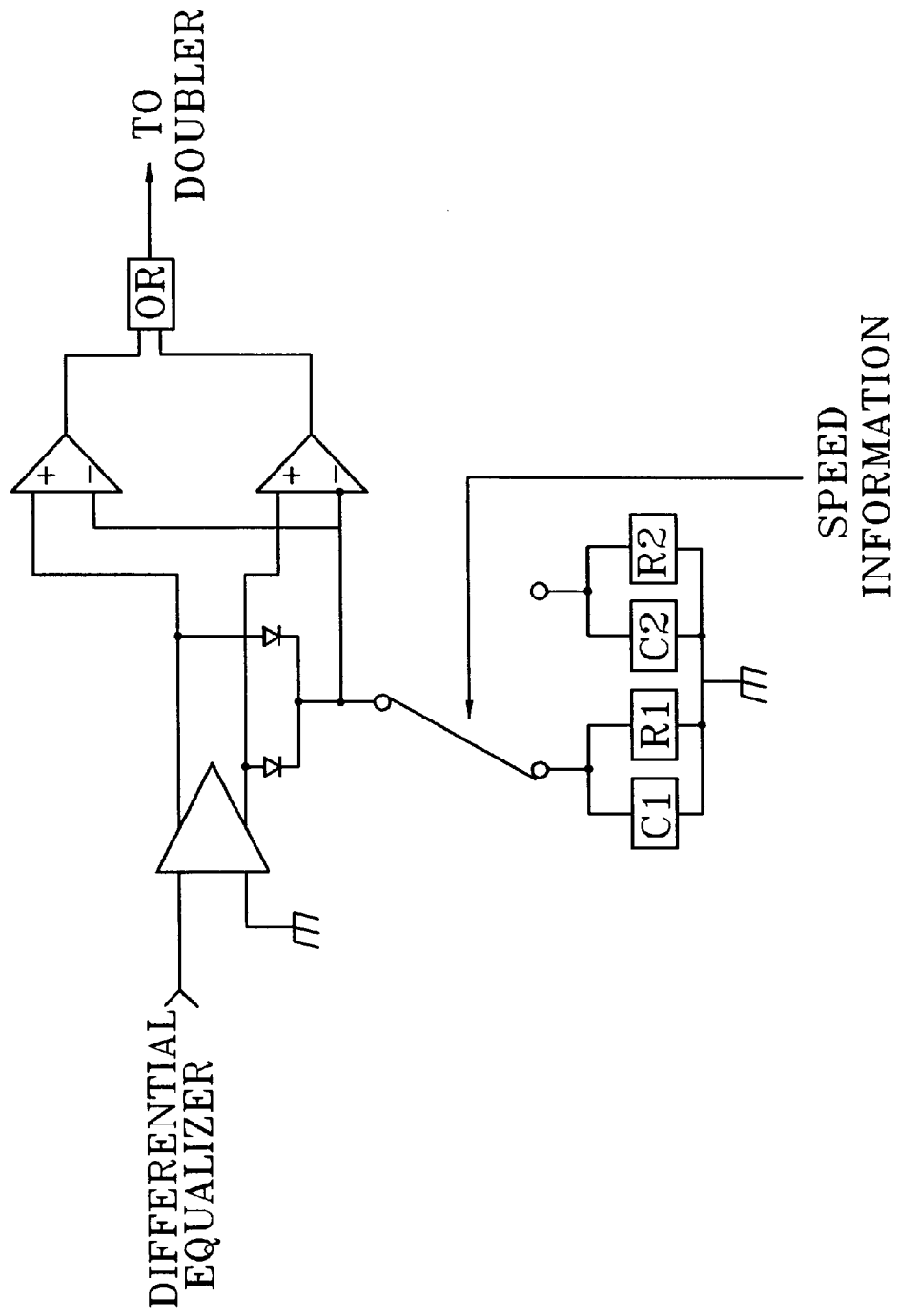

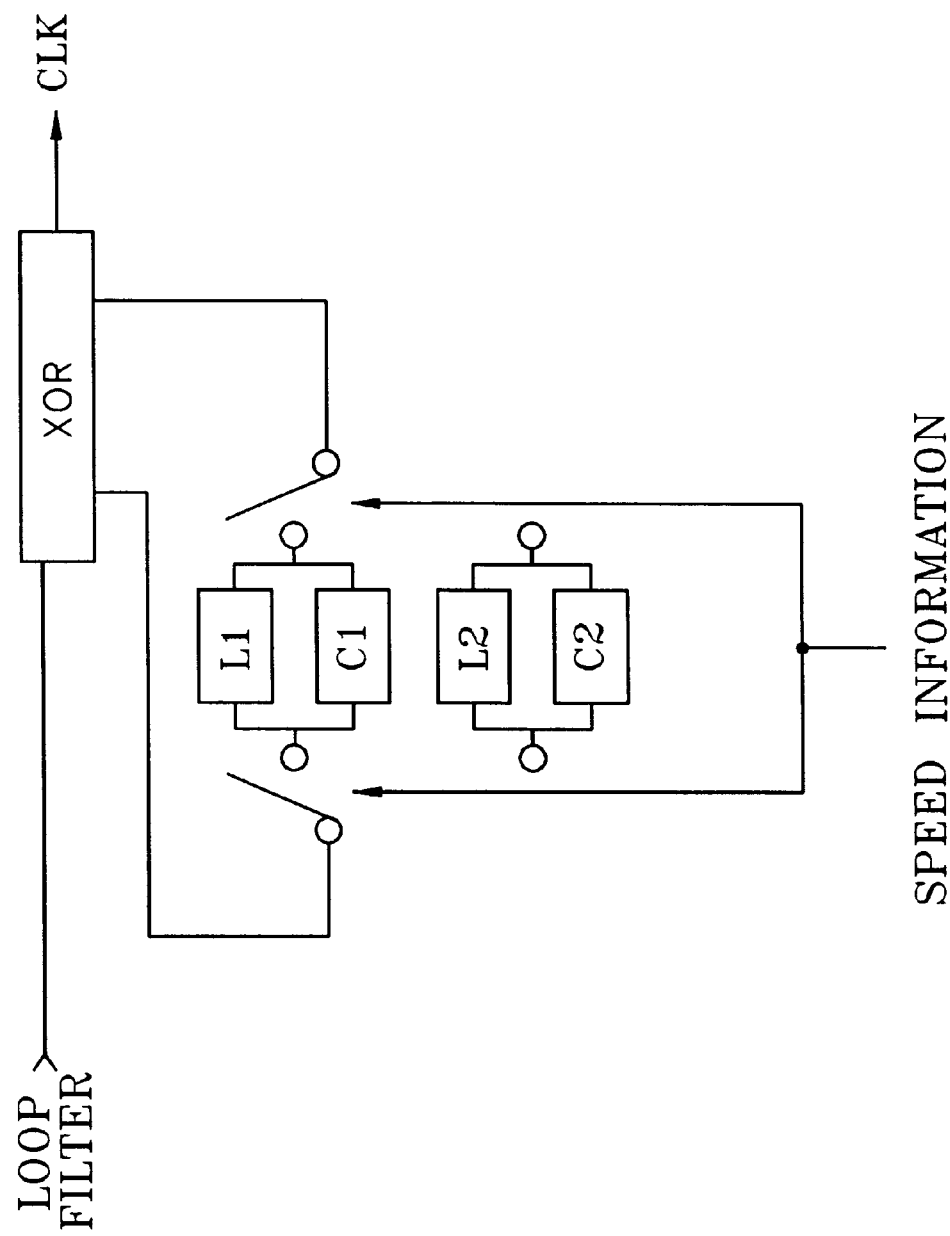

DIGITAL RECORDING AND REPRODUCING APPARATUS FOR HIGH-SPEED COPYING OF TAPE

BACKGROUND OF THE INVENTION

The present invention relates to a high speed digital recording and reproducing apparatus such as a video cassette recorder for duplicating the contents contained in a source tape in a number of target tapes.

Generally, in copying information by using magnetic tape as a recording medium, a reproducer for reproducing the contents from a source tape and a recorder for recording the contents on a target tape are required. Therefore, when the information contained in a source tape is duplicated in 100 units of target tape using one reproducer and 100 recorders, the duplication time corresponds to the recording time of the program on the source tape, but this technique consumes a significant amount of power. Meanwhile, when a one-hour length of source tape is duplicated in 100 units of target tape using one reproducer and one recorder, a total duplication time requires at least 100 hours, thereby requiring significant time and power consumption.

SUMMARY OF THE INVENTION

To solve the above problems, it is an object of the present invention to provide a digital recording and reproducing apparatus for high-speed duplication of a number of tapes to reduce a duplication time and power consumption by combining the number and arrangement of heads in a suitable manner. For example, adjustments are made to the diameter of a head drum, a tape travel speed, a tape surrounding angle and also the signal processing blocks of the apparatus.

To accomplish the above object of the present invention, there is provided a high speed digital recording and reproducing apparatus for duplicating a source tape to one or more target tapes at a speed N-times faster than a normal speed duplication, wherein normal speed duplication uses head drums having a diameter of $DD_O$, a tape surrounding angle $WA_O$, and a rate of drum rotation $RPM_O$, the digital recording and reproducing apparatus comprises:

a reproducing head drum and a recording head drum having a diameter of $N/2 \times DD_O$, and using a surrounding angle $2/N \times WA_O$;

2N reproducing heads and recording heads which are disposed on the reproducing and recording head drums, respectively;

signal processing means for processing signals read from the reproducing heads to match the N-times high-speed duplication rate and for supplying the processed signal to the recording heads; and control means for transferring the source tape and target tape at N-times the tape speed for normal speed duplication, and for controlling the head drums to rotate at a rate $RPM_N$ which meets the condition:

$$RPM_N = (N \times DD_O \times RPM_O)/DD_N,$$

where $DD_N$ is the diameter of the head drum used at N-times duplicating speed.

To accomplish the above objects of the present invention, there is also provided a high speed digital recording and reproducing apparatus for duplicating a source tape to one or more target tapes at a speed N-times faster than a normal speed duplication, wherein the normal speed duplication uses head drums having a diameter of $DD_O$, a tape surrounding angle of $WA_O$, and a rate of drum rotation $RPM_O$, the digital recording and reproducing apparatus comprises:

a reproducing head drum and a recording head drum having a diameter of $N \times DD_O$ and uses a surrounding angle of $WA_O/N$;

2N reproducing heads and recording heads which are disposed on the reproducing and recording head drums, respectively;

signal processing means for processing signals read from the reproducing heads to match the N-times high-speed duplication rate and for supplying the processed signal to the recording heads; and control means for transferring the source tape and target tape at N-times the normal tape speed, and for controlling the head drums to rotate at a rate of rotation $RPM_N$ which meets the condition:

$$RPM_N = (N \times DD_O \times RPM_O)/DD_N,$$

where $DD_N$ is the diameter of the head drum used at N-times duplicating speed.

BRIEF DESCRIPTION OF THE DRAWINGS

The preferred embodiment is described with reference to the drawings wherein:

FIGS. 3A and 3B are block diagrams of a digital recording and reproducing apparatus for normal speed duplication.

FIG. 5A is a block diagram showing a reproduction deck portion and an amplifier shown in FIG. 4B.

FIG. 5B is a block diagram showing a recording deck portion and an amplifier shown in FIG. 4B.

FIGS. 6A and 6B are operational timing diagrams for the apparatuses illustrated in FIGS. 5A and 5B, respectively.

FIGS. 12A, 12B and 12C are detailed block diagrams of a detector, a doubler and a voltage-controlled oscillator, respectively.

DETAILED DESCRIPTION OF THE PREFERRED EMBODIMENT

A preferred embodiment of the present invention will be described below in more detail with reference to the accompanying drawings.

In the SD-VCR recording format, a track angle is typically 9.16680° and a track pitch is typically 10.0 μm. Such fundamental conditions should be met even though the recording and reproduction apparatus may be varied in its constitution. To provide a stable number of drum rotations while meeting the above fundamental conditions, the number of drum rotations is 9000/1.001 rpm in the case of the NTSC system, the drum diameter is 21.7 mm and the tape travel speed is 18.831/1.001 mm/second in a known recording and reproduction system. Therefore, the relative speed between the tape and the head is 10.19711 mm/s, and an effective track length is 32.89017 mm.

Figure 1B:
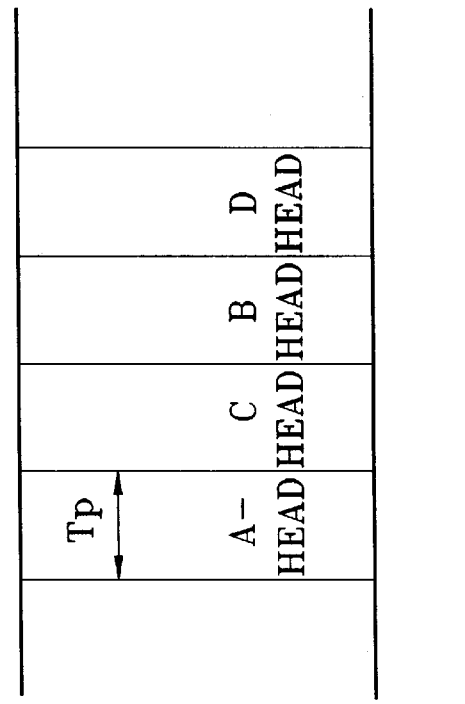
FIGS. 1A through 1C are views for explaining an arrangement of heads for double-speed duplication of a digital recording and reproducing apparatus according to the present invention.
Figure 1A:
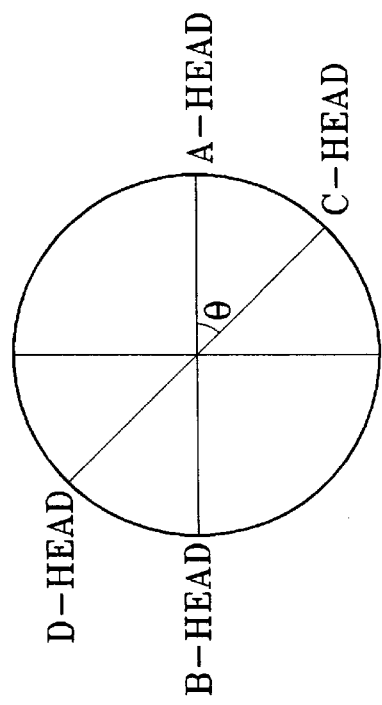
Figure 1C:
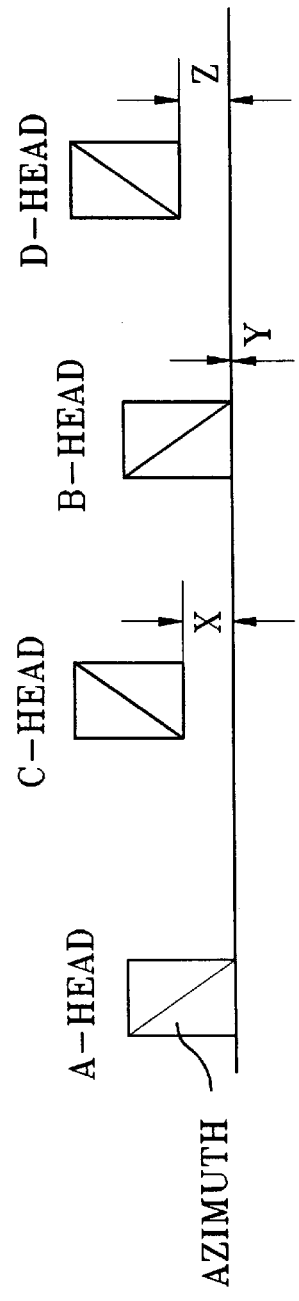

FIGS. 1A through 1C are views for explaining arrangements of heads for double-speed tape duplication in a digital recording and reproducing apparatus according to the present invention. FIG. 1A schematically shows mounting angles of heads B, C and D on a drum with respect to a reference head A. The head C is spaced by an angle $\theta$ from the head A, and when $\theta=45°$, the heads B and D are spaced by 180° and 225° from the head A, respectively. FIG. 1B shows an arrangement for a track of the heads, and the heads are disposed on the tracks in sequence of A, C, B and D. FIG. 1C shows mounting heights of the heads, in which the head C has an offset of x with respect to the head A and the head B has an offset of y with respect to the head A. The head D has an offset of z with respect to the head B. The oblique lines shown in the heads of FIG. 1C represent an azimuth of a corresponding head. When a track pitch Tp is 10 $\mu$m, the offsets x, y and z of the heads C, B and D with respect to the head A may be determined as follows.

In the head C, when $\theta=45°$ with respect to the head A, since $Tp=x+Tp\times\theta/180$, $x=Tp-Tp\times\theta/180=10-10\times45/180=7.5$ $\mu$m.

In the head B, when $\theta=180°$ with respect to the head A, since $Tp=y+Tp$, $y=Tp-Tp=0$.

In the head D, when $\theta=45°$ with respect to the head B, since $Tp=z+Tp\times45/180$, $z=Tp-Tp\times45/180=10-10\times45/180=7.5$ $\mu$m.

Based on the above, conditions for high-speed duplication can be varied. FIGS. 2A through 2E are views showing head arrangements appropriate for high-speed duplication according to such variations. Prior to describing FIGS. 2A–2E, it is assumed that for FIG. 2A, a respective dimension of a drum diameter, a rate of drum rotation, a tape speed, a surrounding angle and a duplication speed are each provided at a reference 1 for these parameters. In other words, FIG. 2A corresponds to a head arrangement (including drum diameter $DD_O$, drum rotation $RPM_O$, tape speed $TS_O$, and surrounding angle $WA_O$, and duplication speed N=1) in the case when a normal speed reproduction and recording is performed using two heads.

Figure 2A:
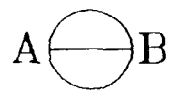
FIGS. 2A through 2E are views showing head arrangements and drum diameters for high speed duplication as compared to the head arrangement and drum diameter for a reference, or normal, speed duplication.
Figure 2B:

FIG. 2B shows the heads A through D disposed to have the same head arrangement and offsets as those of FIG. 1. In the head arrangement shown in FIG. 2B, when the drum diameter and the surrounding angle are maintained at the reference condition, and the rate of drum rotation and the tape speed are doubled, it is possible to duplicate at twice the rate as in the reference case.

Figure 2C:
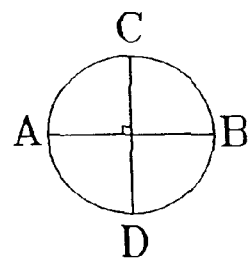

FIG. 2C shows a head arrangement having an angular interval of 90° between the heads A through D, and a head drum having a diameter of twice the reference diameter. In FIG. 2C, if the rate of drum rotation is maintained at the reference condition, the drum diameter and the tape speed are doubled, and the surrounding angle is halved, it is possible to perform double-speed duplication.

Figure 2D:
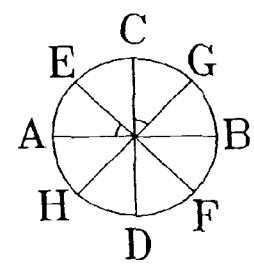

FIG. 2D shows a head arrangement having an angular relationship of 45° between the heads A through D, and the head drum has a diameter of 2×$DD_O$. In FIG. 2D, if the rate of drum rotation is doubled, the tape speed is multiplied by four and the surrounding angle is halved, it is possible to perform duplication at four times the speed provided by the arrangement of FIG. 2A.

Figure 2E:
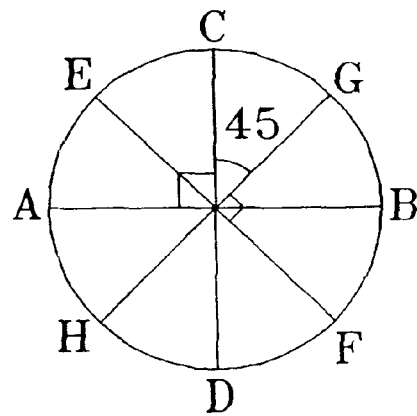

FIG. 2E shows a head arrangement having an angular relationship of 45° between the heads A through D, and the head drum has a diameter of 4×$DD_O$. In FIG. 2E, if the rate of drum rotation is maintained at $RPM_O$, the drum diameter and the tape speed are multiplied by four and the surrounding angle is reduced by a factor of four, it is possible to perform duplication at four times the rate as the reference condition.

Based on the above conditions, the digital recording and reproducing apparatus should be constructed to meet the proper combination of the following equations to perform a high-speed tape duplication operation.

Surrounding angle=[tape surrounding angle ($WA_O$) at the reference speed]/[drum diameter].

Necessary number of heads=[the number of duplications]×2.

Amount of increase in duplication speed=[drum diameter/drum diameter of the reference condition ($DD_O$)]×[the number of drum rotations/the number of drum rotations at a normal speed].

Tape speed=[tape speed $TS_O$ in the reference condition]×[the amount of increase in duplication speed].

Prior to describing the FIG. 4 apparatus for explaining double-speed duplication according to the present invention, an example of normal speed duplication using a digital recording and reproduction apparatus will be described with reference to FIGS. 3A and 3B.

Figure 3B:
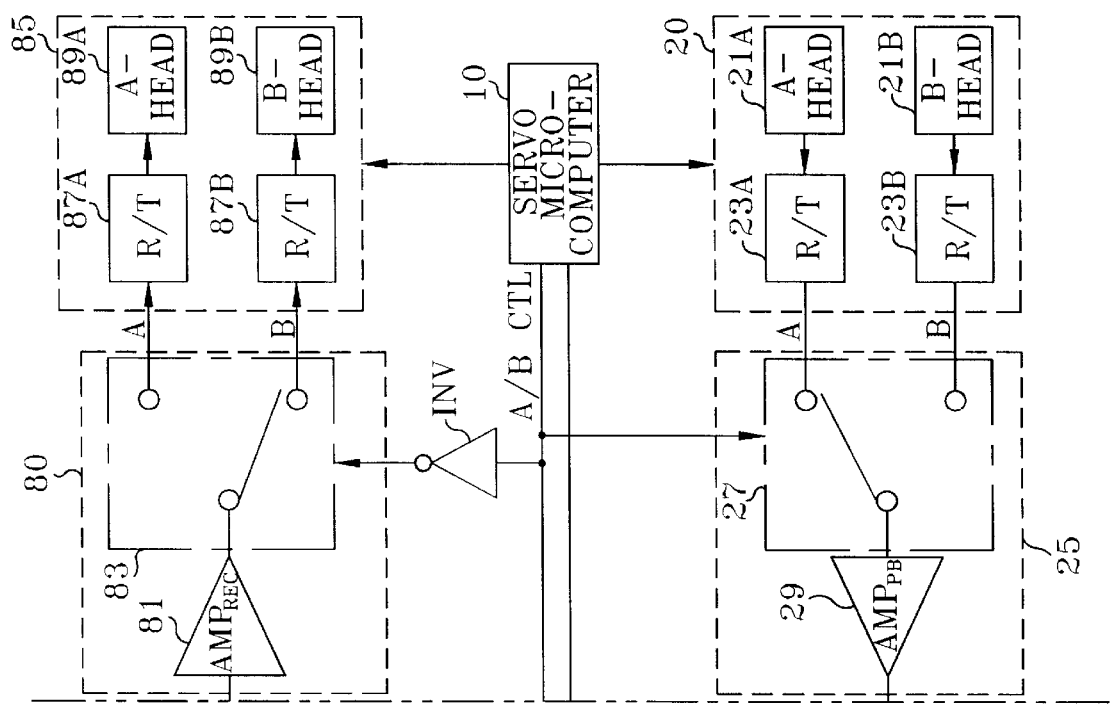

The FIG. 3A–B apparatus includes a servo microcomputer 10 for controlling a general operation of the apparatus. A reproduction deck portion 20 alternately operates on an A-head 21A and a B-head 21B according to servo control signals of the servo microcomputer 10 and reads data from a corresponding track of source tape (not shown). The signals read via the A-head 21A and the B-head 21B are transmitted to a reproduction amplifier 25 via corresponding rotary transformers 23A and 23B. In the reproduction amplifier 25, a switch 27 alternately selects a reproduction signal from the A-head 21A and the B-head 21B according to a control signal A/B CTL from the servo microcomputer 10 having an operational timing of a period T of (1/rps) sec, and outputs the selected result. Here, rps means rotations per second of the drum. The reproduction signal output from the switch 27 is amplified to a certain magnitude by the amplifier $AMP_{PB}$ 29, and is output to a data detector portion 30.

The data detector portion 30 receives the amplified reproduction signal and speed information output from the servo microcomputer 10. An equalizer 31 in the data detector portion 30 performs an equalization operation for matching duplication speed according to the speed information with the input reproduced signal from the amplifier $AMP_{PB}$ 29. The equalized signal is input to a detector 35 and the PLL 33. The PLL 33 receives the equalized signal and the speed information and generates a clock matching the speed information. The detector 35 uses the clock generated in the PLL 33 and detects digital data from the equalized signal.

The digital data detected in the data detector portion 30 is input to a sync restorer 40 performing sync restoration. A demodulator 50 demodulates the sync-restored digital data into original data, and demodulated data is output to a memory portion 60. A switch 61 in the memory portion 60 alternately supplies the demodulated data input from the demodulator 50 to track memories 63A and 63B according to the control signal A/B CTL generated by the servo microcomputer 10. The track memories 63A or 63B, receiving data through the switch 61, store the input data. The track memories 63A and 63B operate according to the clock A/B CLK generated in the PLL 33 of the data detector portion 30. Meanwhile, a switch 65 connected to the outputs of the two track memories 63A and 63B is reciprocally switched with respect to switch 61, to output the demodulated data stored in the corresponding track memory 63A or 63B. That is, during the time when the A-track memory 63A stores the demodulated data input from the demodulator 50, the B-track memory 63B outputs the stored demodulated data. Then, during the time when the A-track memory 63A outputs the demodulated data, the B-track memory 63B stores the input demodulated data. The data output via the switch 65 is supplied to a modulator 70. The modulator 70 modulates the input data, matching a channel characteristic, and outputs the modulated data to a recording amplifier portion 80. An amplifier $AMP_{REC}$ in the recording amplifier portion 80 amplifies the output of the modulator 70 to a certain magnitude and then outputs the amplified result to a switch 83. An inverter INV inverts the control signal A/B CTL of the servo microcomputer 10 and transmits the inverted control signal to the switch 83. Therefore, the switch 83 of the recording amplifier portion 80 is reciprocally switched with respect to the switch 27 of the reproduction amplifier portion 25 by the inverter INV. The switch 83 alternately applies the data amplified in the amplifier $AMP_{REC}$ 81 to two rotary transformers R/T 87A and 87B of the recording deck portion 85 according to the signal inverted in the inverter INV. The rotary transformers 87A and 87B of the recording deck portion 85 record the data input via the switch 83 on a target tape (not shown) via an A-head 89A or a B-head 89B. Thus, the contents of the source tape reproduced in the reproduction deck portion 20 are duplicated on the target tape of the recording deck portion 85.

Figure 4A:
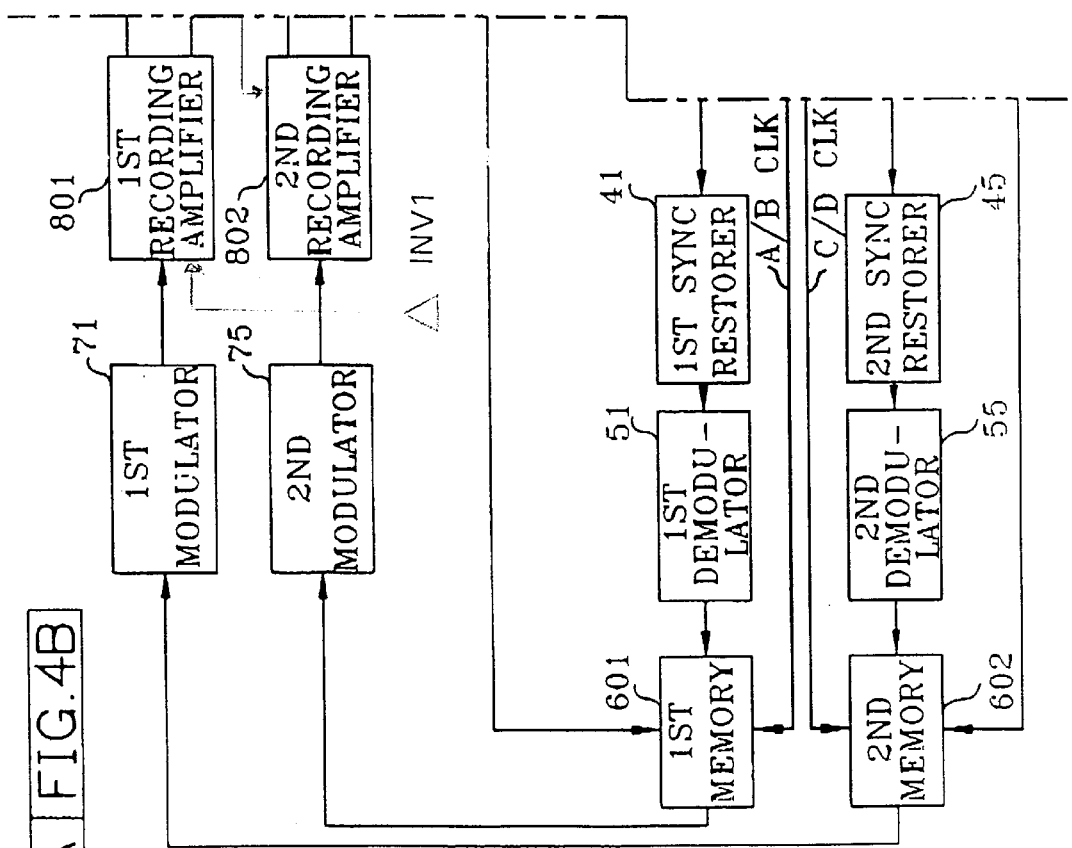
FIGS. 4A and 4B are block diagrams of a digital recording and reproducing apparatus implementing double speed duplication according to one embodiment of the present invention.
Figure 4B:
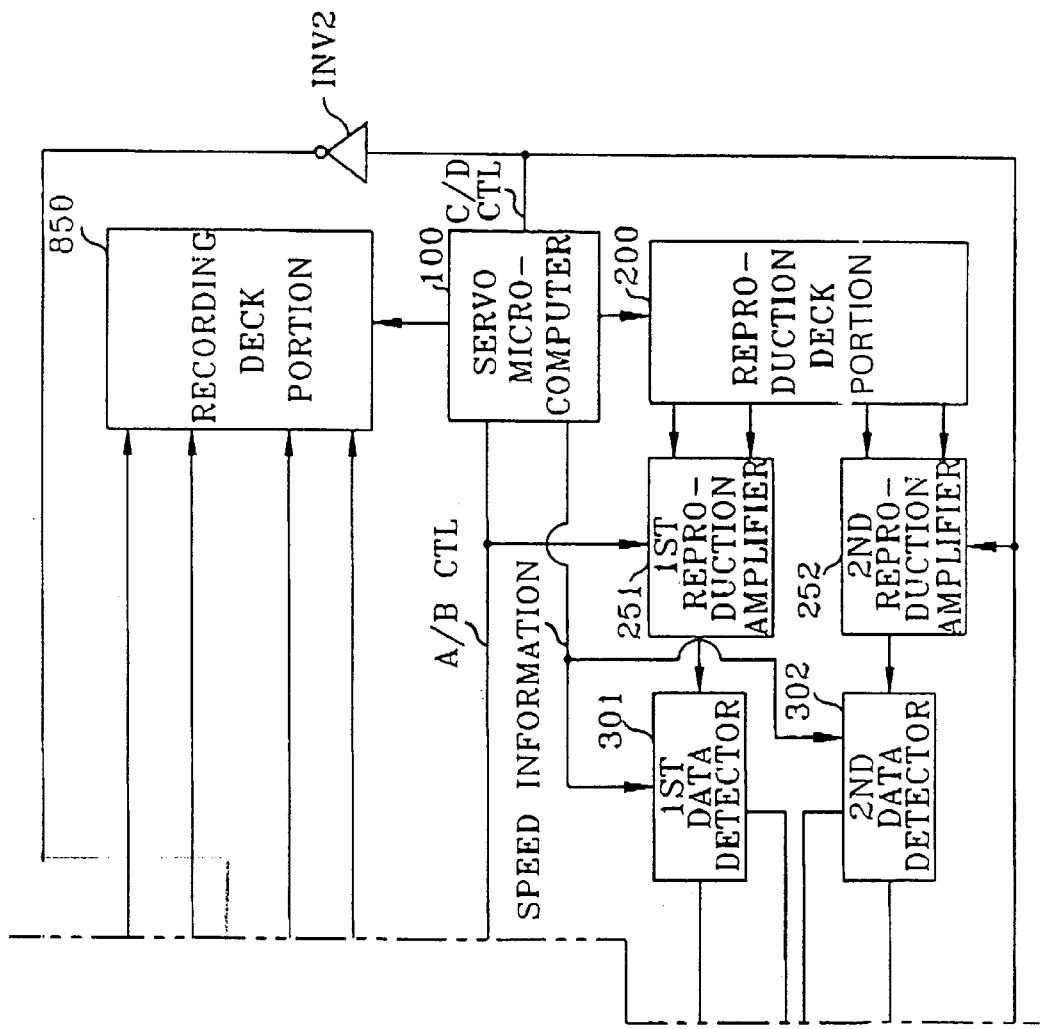

FIGS. 4A and 4B together form a block diagram of a digital recording and reproducing apparatus appropriate for double speed duplication according to one embodiment of the present invention. The FIG. 4 apparatus for implementing the double speed duplication is designed to meet the head arrangement and conditions described with reference to FIGS. 1 and 2B. Construction and operation of the apparatus will be described with reference to FIGS. 5A through 12C.

The reproduction deck portion 200, which operates according to the servo control of the servo microcomputer 100, includes four heads 21A through 21D and four rotary transformers 23A through 23D which respectively correspond to the four heads. This arrangement is shown in FIG. 5A. The A-head 21A and the B-head 21B alternately operate and the C-head 21C and the D-head 21D also alternately operate. The heads 21A and 21B operate independently from the heads 21C and 21D. The reproduction deck portion 200 outputs the reproduction signal read from corresponding tracks on the source tape according to the operation of the heads. The data is read out to the reproduction amplifier 251 or 252 via the rotary transformer 23A, 23B, 23C or 23D.

In a first reproduction amplifier 251, a switch 271 performs an alternate switching operation according to the control signal A/B CTL of the servo microcomputer 100, and selects a signal read via the A-head 21A or the B-head 21B to output the selected signal to the amplifier $AMP_{PB}$ 291. The timing diagram of the control signal A/B CTL is shown in FIG. 6A. The amplifier $AMP_{PB}$ 291 amplifies the signal selected in the switch 271 to a certain magnitude and outputs the amplified result to a first data detector 301. A switch 272 of a second reproduction amplifier 252 alternately selects the reproduced signals read via the C-head 21C and the D-head 21D according to the control signal C/D CTL of the servo microcomputer 100 having the operational timing shown in FIG. 6B, to output the selected signal to an amplifier $AMP_{PB}$ 292. The amplifier $AMP_{PB}$ 292 amplifies the signal selected in the switch 272 to a certain magnitude and outputs the amplified result to a second data detector 302. A period T of each control signal A/B CTL or C/D CTL shown in FIGS. 5A and 5B are indicated as (1/rps)sec. A time difference t between the control signals A/B CTL and C/D CTL is $[(1/rps) \times (\theta/360)]$sec, in which $\theta$ corresponds to an angle between the A head and the C-head in a manner similarly described with reference to FIG. 1.

The first and second data detectors 301 and 302 receive the signal amplified in the corresponding reproduction amplifiers 251 and 252 and the speed information from the servo microcomputer 100. The first data detector 301 and/or the second data detector 302 includes an equalizer 310 for receiving the output signal of the corresponding reproduction amplifier and the speed information and outputting the equalized signal, a PLL 330 for generating clock A/B CLK and/or C/D CLK using the output of the equalizer 310 and the speed information, and a detector 350 for receiving the output of the equalizer 310 and the speed information and detecting the data. Such first and second data detectors 301 and 302 perform amplitude equalization, phase equalization and differential equalization of the signal input from the reproduction amplifier appropriate for the duplication speed according to the speed information, and detects digital data from the equalized signal based on the generated clock. Detailed descriptions with respect to an equalizing portion 310 including an amplitude equalizer 311, a phase equalizer 313 and a differential equalizer 315, a PLL 33 and a detector 35 will follow with reference to FIGS. 8 through 12C.

The digital data detected respectively in the first and second data detectors 301 and 302 are input to corresponding first and second sync restorers 41 and 45, to be sync-restored. A first demodulator 51 and a second demodulator 55 receive the sync-restored digital data from the corresponding sync restorers 41 and 45 and demodulate the received data into original data. The demodulated data is input to the first and second memories 601 and 602.

Figure 7A:
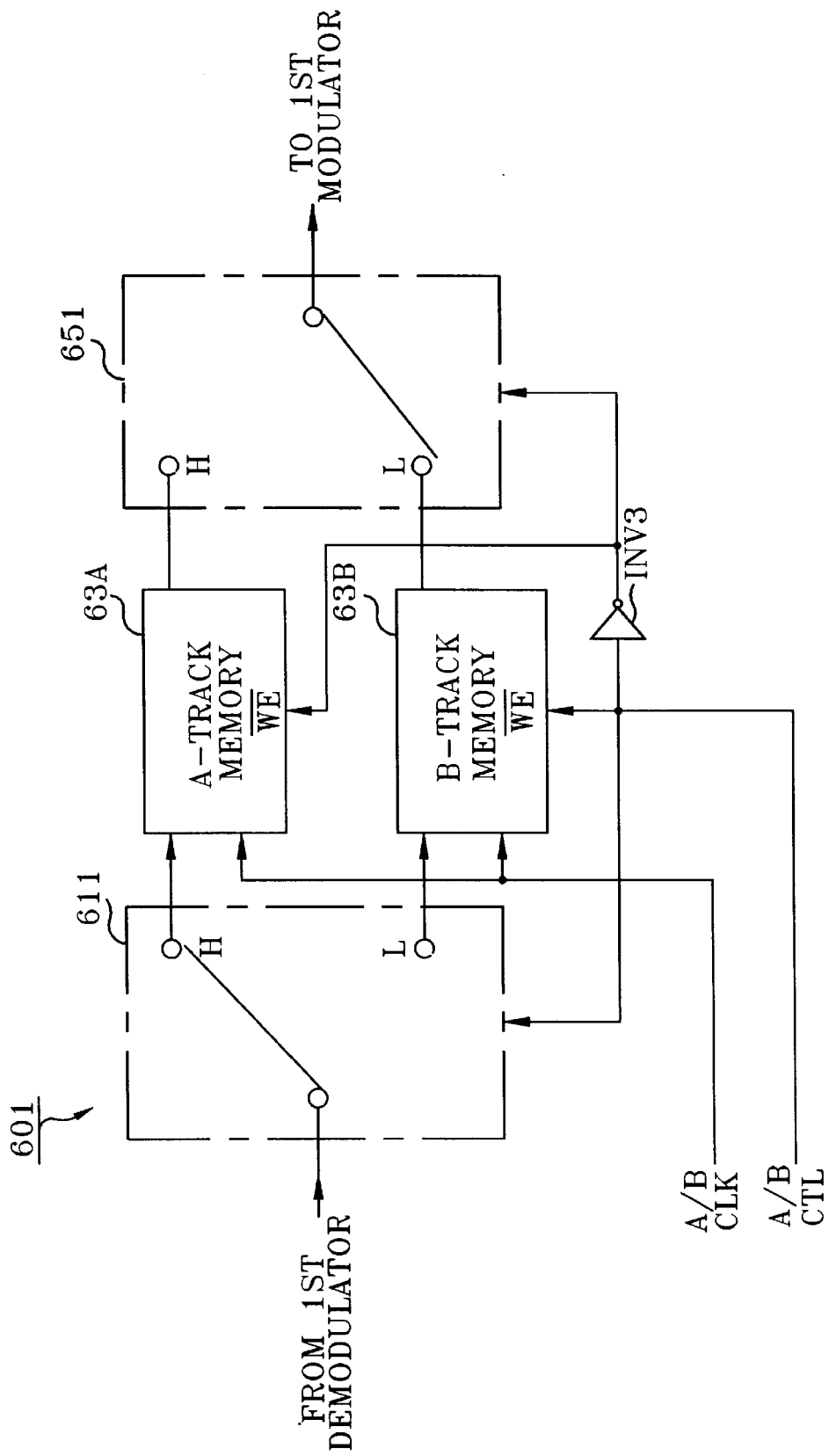
FIGS. 7A and 7B are detailed block diagrams of track memories of FIG. 4A.
Figure 7B:
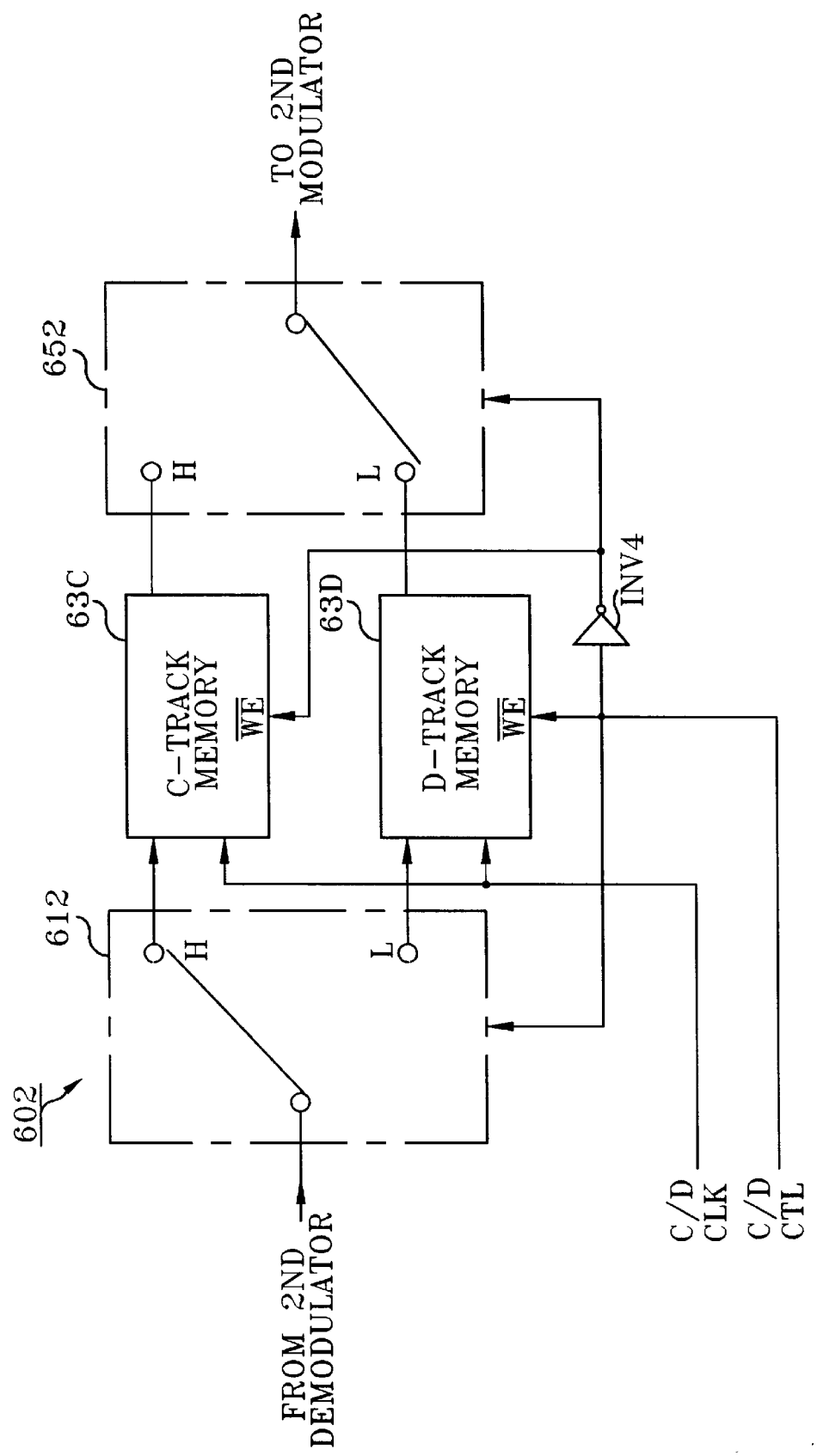

The first and second memories 601 and 602 have the constitution shown in FIGS. 7A and 7B, respectively. In the first memory 601, shown in FIG. 7A, a switch 611 alternately supplies the demodulated data supplied from the first demodulator 51 to the input ends of the A-track memory 63A and the B-track memory 63B according to the control signal A/B CTL of the servo microcomputer 100. For example, the switch 611 selects the A-track memory 63A at the "high" level interval of the control signal A/B CTL and selects the B-track memory 63B at the "low" level interval of the control signal A/B CTL. The A-track memory 63A and the B track memory 63B operate according to the clock A/B CLK generated in the first data detector 301. The B-track memory 63B has a write enable terminal $\overline{WE}$ for receiving the control signal A/B CTL output from the servo microcomputer 100 and the A-track memory 63A has a write enable terminal $\overline{WE}$ for receiving the control signal A/B CTL to be inverted by the inverter INV3. The A-track memory 63A and the B-track memory 63B alternately become active based on the write enable state to store the data selected in the switch 611 and outputs the stored data during an interval where the write enable state is inactive. The switch 651 selects the outputs of the A-track memory 63A and the B-track memory 63B according to the output of the inverter INV3 for inverting the control signal A/B CTL, and outputs the selected data to the first modulator 71.

In the second memory 602, shown in FIG. 7B, the switch 612 selectively supplies the demodulated data supplied from the second demodulator 55 to the C-track memory 63C and the D-track memory 63D according to the control signal C/D CTL of the servo microcomputer 100. The C-track memory 63C and the D-track memory 63D operate according to the clock C/D CLK of the second data detector 302. The D-track memory 63D receives the control signal C/D CTL of the servo microcomputer 10 via the write enable terminal $\overline{WE}$ and the C-track memory 63C receives the output of the inverter INV4 for inverting the control signal C/D CTL via the write enable terminal $\overline{WE}$. The switch 652 operates according to the output of the inverter INV4 for inverting the control signal C/D CTL. Since the operation of the second memory 602 described above is apparent to a person skilled in the art who understands the operation of the first memory 601, the detailed descriptions of the second memory will be omitted.

The first and second modulators 71 and 75 modulate the data supplied from the track memories 602 and 601, respectively, and output the modulated data to the corresponding recording amplifiers 801 and 802, respectively. Referring to FIG. 5B, the first recording amplifier 801 amplifies the modulated data of the first modulator 71 to a certain magnitude via the amplifier $AM_{REC}$ 811 and outputs the amplified result to the switch 831. The switch 831 alternately transmits the input data to the rotary transformer 87A or 87B of the recording deck portion 850 according to a control signal A/B CTL produced by the servo microcomputer 100. The data transmitted to the A-head 89A or the B-head 89B is recorded on the track of the target tape. The second recording amplifier portion 802 includes an amplifier $AM_{REC}$ 812 for amplifying the modulated data into a certain magnitude and a switch 832 for selectively outputting the output of the amplifier $AMP_{REC}$ 812 according to a control signal C/D CTL produced by the servo microcomputer 100. The switch 832 alternately supplies the output of the amplifier $AMP_{REC}$ 812 to the rotary transformer 87C and 87D, and the data is recorded on the corresponding track of the target tape via the C-head 89C connected to the output of the rotary transformer 87C and the D-head 89D connected to the output of the rotary transformer 87D. Thus, the contents of the source tape reproduced from the reproduction deck portion 200 are duplicated on the target tape of the recording deck portion 850 in double speed.

The above-described FIG. 4 apparatus has a general construction similar to the FIG. 3 apparatus to perform a double speed duplication operation. Therefore, in case when an N-tuple speed duplication operation is performed, N units of the processing circuits of FIG. 3 may be provided. However, the head configuration conditions for the N-tuple speed duplication are determined based on the above-described equations.

Figure 9A:
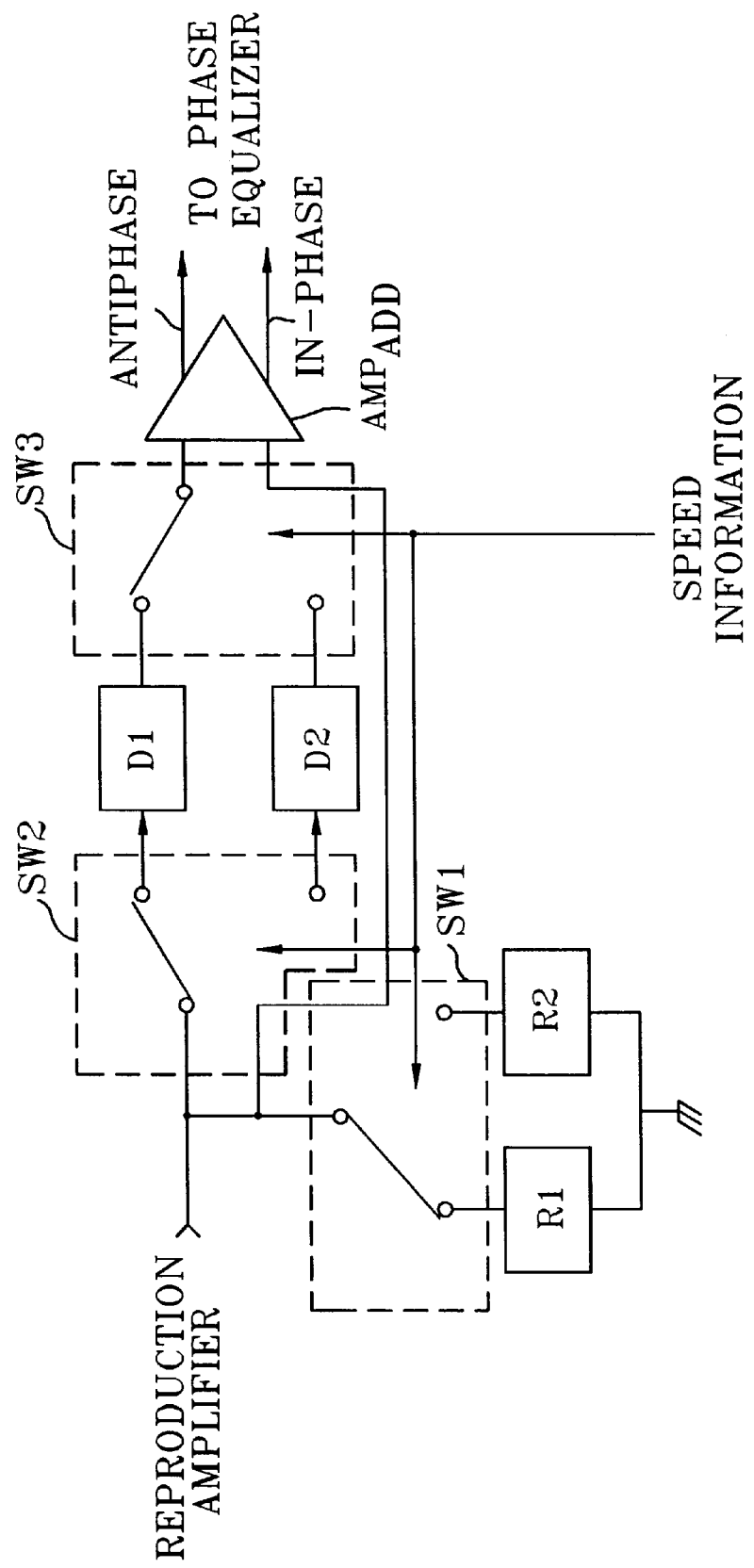
FIGS. 9A, 9B and 9C are detailed block diagrams of an amplitude equalizer, a phase equalizer and a differential equalizer of FIG. 8.
Figure 9B:
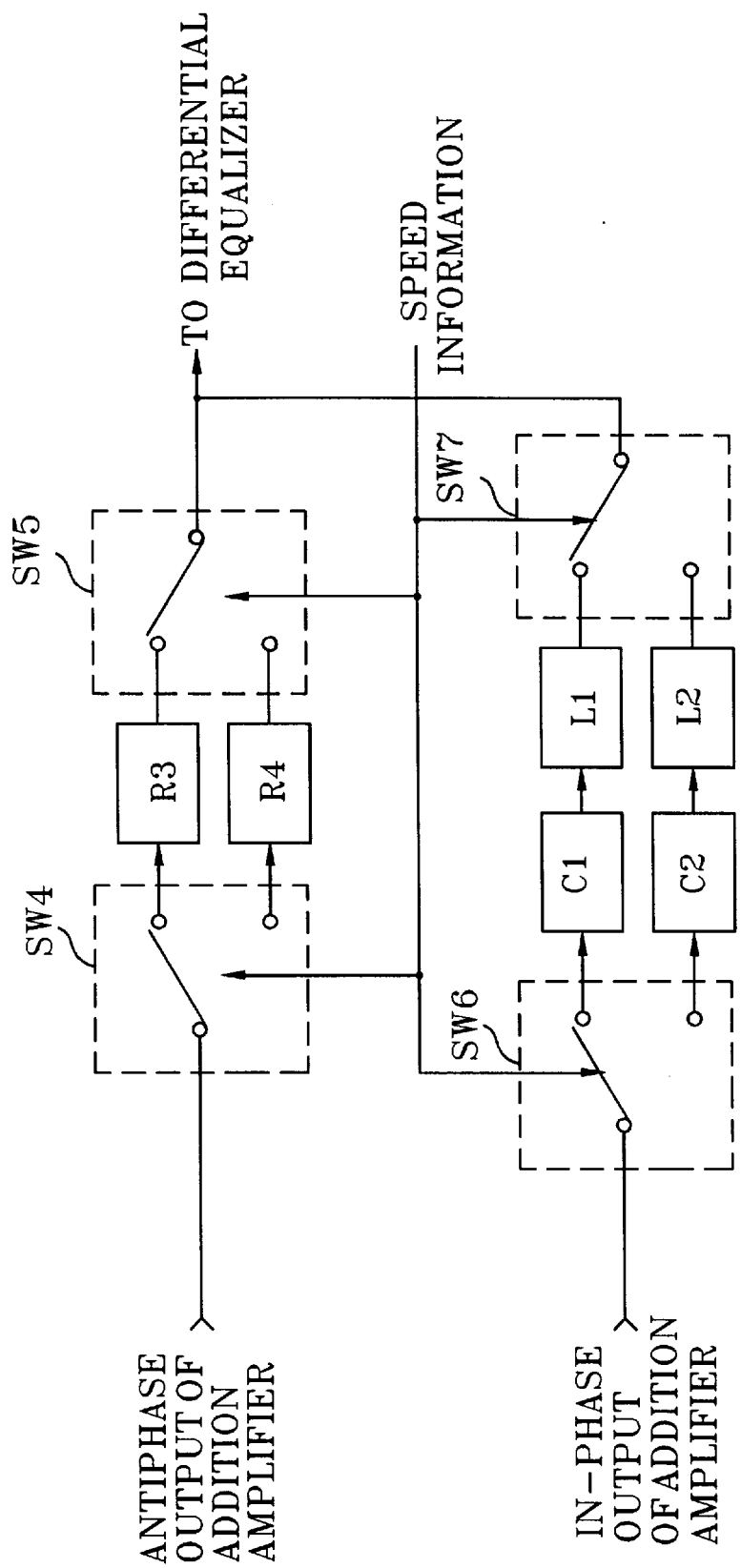
Figure 9C:
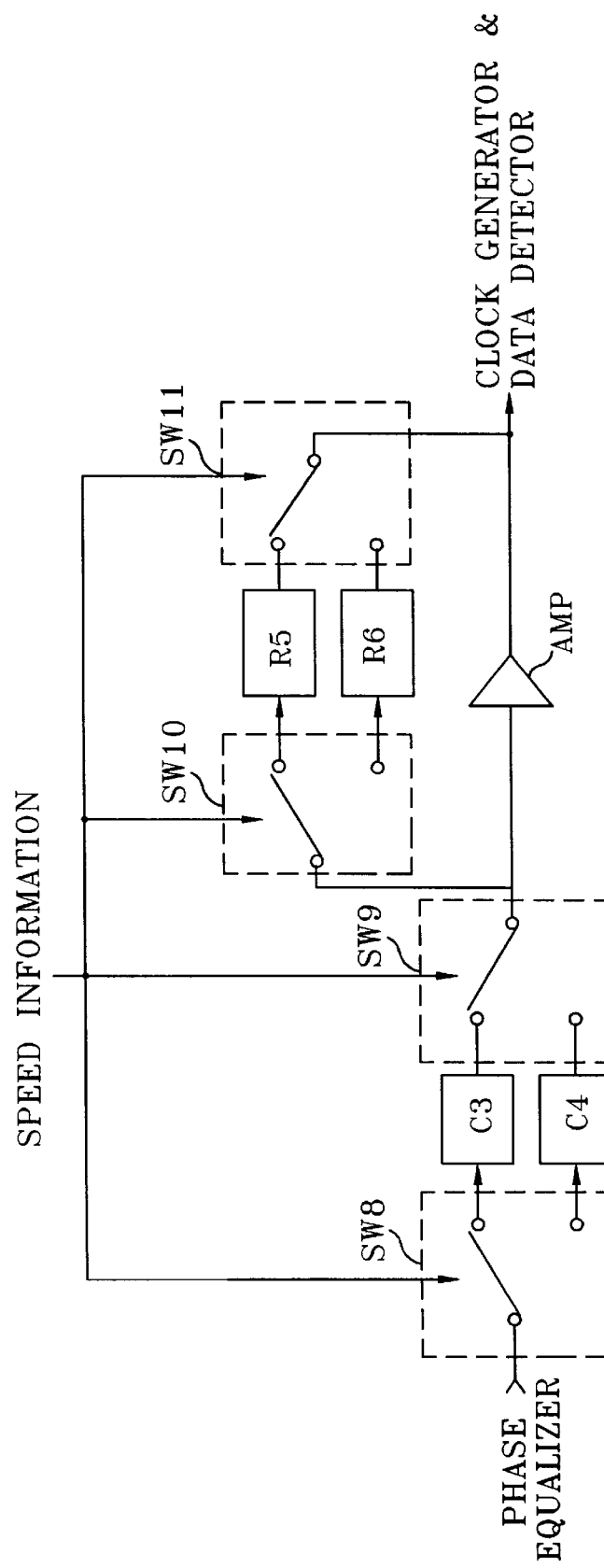

FIGS. 9A, 9B and 9C are detailed block diagrams of an amplitude equalizer 311, a phase equalizer 313 for compensating for a phase distortion and a differential equalizer 315 for compensating for a distortion due to a differential characteristic.

The amplitude equalizer 311 shown in FIG. 9A compensates an amplitude distortion due to a recording channel characteristic. The equalizer includes delays D1 and D2 having a respectively different delay time according to the duplication speed, and resistors R1 and R2 which are set to vary a gain according to the duplication speed of the apparatus. Switches SW1–SW3 perform a switching operation according to speed information from the microcomputer 100 to perform the appropriate level of amplitude equalization. For example, in case of normal speed duplication, the first delay D1 and the first resistor R1 are used, and in case of a double speed duplication, the second delay D2 and the second resistor R2 are used. Here, the delay time of the first delay D1 is 10 ns, and that of the second delay D2 is 20 ns, for example. The output signal of the reproduction amplifier portion is gain-controlled according to a resistance value of the resistor R3 or R4 selected by the switch SW1 using the speed information output from the servo microcomputer 100. The gain-controlled signal is input to delay D1 or D2 selected by the switch SW2 and at the same time is input to an addition amplifier $AMP_{ADD}$. The delay D1 or D2 delays the input signal by a predetermined delay time and outputs the delayed result. The addition amplifier $AMP_{ADD}$ linearly adds the delayed signal output from the delay D1 or D2 selected by the switch SW3 and an original signal to amplitude-equalize the input signal, and amplifies the equalized signal by a predetermined magnitude to output an in-phase amplified signal and an antiphase, or out of is phase, amplified signal.

The phase equalizer 313 shown in FIG. 9B includes two resonant circuits which are connected in parallel with each other and connected to the in-phase terminal of the addition amplifier $AMP_{ADD}$ in the amplitude equalizer 311, and resistors R3 and R4 having a respectively different resistance value, which are connected in parallel with each other and connected to the antiphase terminal of the addition amplifier $AMP_{ADD}$. Here, each resonant circuit has a capacitor C1 or C2 and a coil L1 or L2 which are connected in series with each other. Here, inductance of the coils L1 and L2, the capacitance of the capacitors C1 and C2 and the resistance value of the resistors R1 and R2 have predetermined values to compensate for a phase distortion of the recording channel characteristic attributable to the duplication speed. The phase equalizer 313 also includes a plurality of switches SW4–SW7 which perform a switching operation to select a capacitance, inductance, and resistance value according to the speed information from the microcomputer 100. If the in-phase amplified signal and the antiphase amplified signal are input, the switches SW4 and SW5 select one of the resistors R3 and R4 according to the speed information of the servo microcomputer 100, respectively. The switch SW6 selects the capacitor C1 or C2 and the switch SW7 selects the coil L1 or L2 according to the speed information. A phase distortion is compensated by a resonant circuit composed of the selected coil and capacitor and the resistor R3 or R4. A mixer (not shown) mixes an in-phase signal and an antiphase signal with respect to a phase distortion compensated signal selected by the switches SW5 and SW7, and outputs the mixed result.

The differential equalizer 315 of FIG. 9C includes a switch SW8 for transferring the phase-equalized signal output from the phase equalizer 313 to one of capacitors C3 and C4 having a respectively predetermined value according to the duplication speed, a switch SW9 for selecting one of the outputs of the capacitors C3 and C4, a switch SW10 for selecting one of resistors R5 and R6, and a switch SW11 for selecting one of the outputs of the resistors R5 and R6. The differential equalizer 315 also includes an amplifier AMP for amplifying the output of a capacitor selected by the switch SW9 according to the speed information from the microcomputer 100. The differential equalizer 315 uses the capacitor C4 and the resistor R6 in case of a double speed, differentiates the input signal and outputs the differentiated result.

Figure 8:
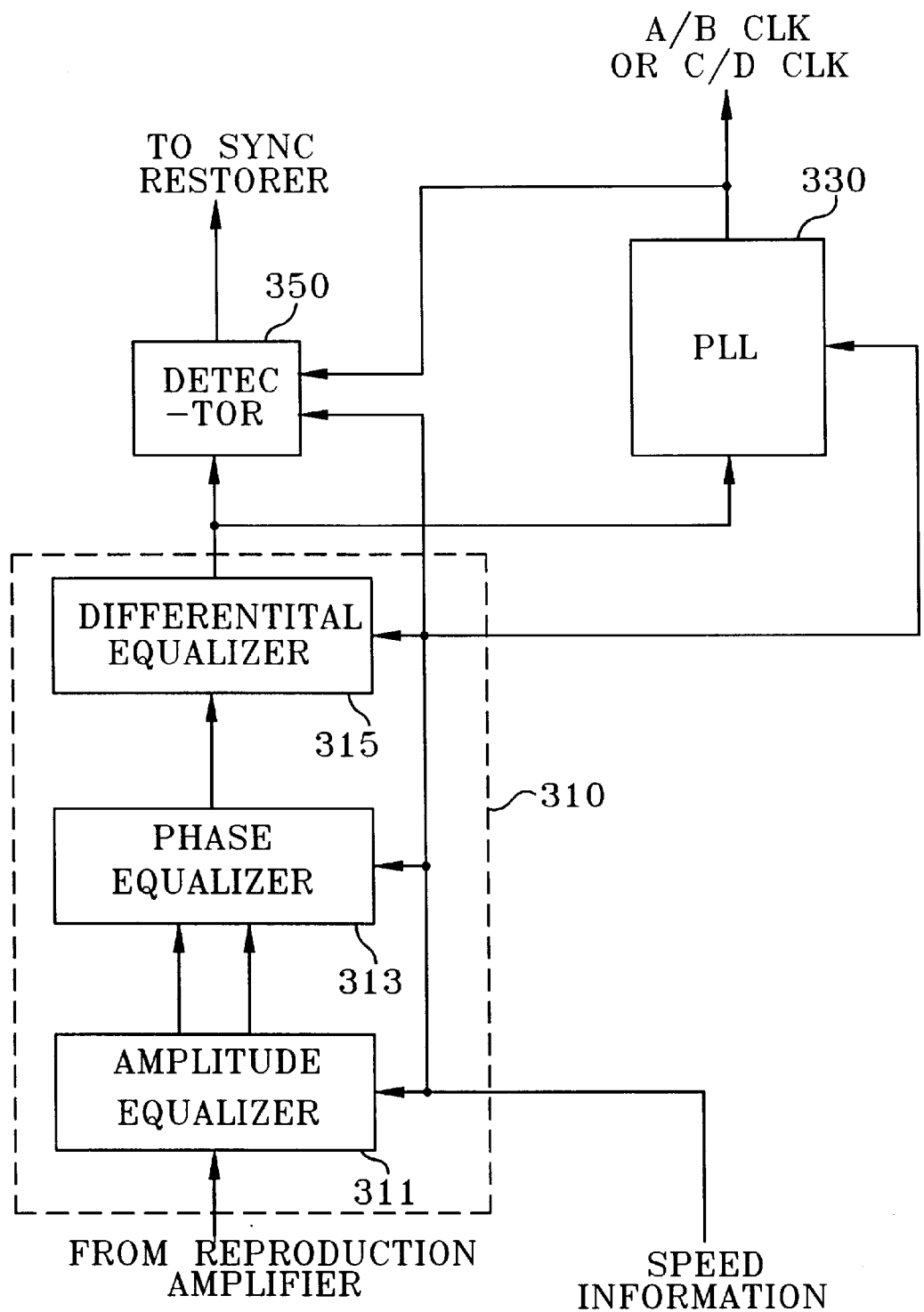
FIG. 8 is a detailed block diagram of a data detector of FIG. 4B.
Figure 10:
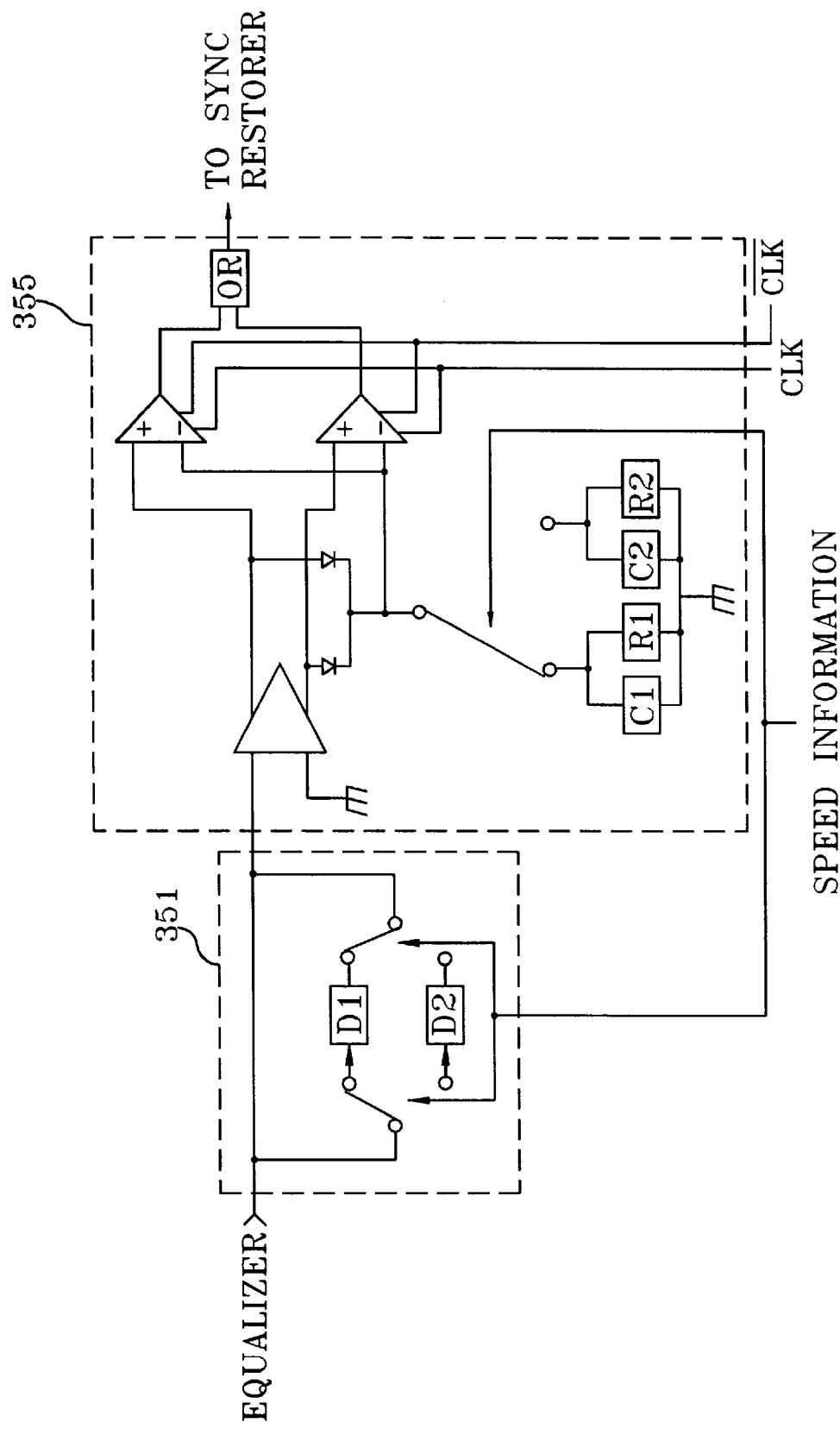
FIG. 10 is a detailed block diagram of a data detector of FIG. 8.

FIG. 10 is a detailed block diagram of a detector 350 of FIG. 8. The detector 350 includes a (1+D) unit 351 and ternary-to-binary value converter 355. The detector 350 has the substantially same constitution as that of the detector 35 of FIG. 3A, in which the delay time, capacitance, and resistance are preset and can be selected based on the speed information output from the servo microcomputer 100. If speed information for a double speed duplication is input, the detector 350 operates so that the (1+D) unit 351 uses the delay D2 and the ternary-to-binary value converter 355 uses the capacitor C2 and the resistor R2. Since the detector 350 operates in the same manner as that of the detector 35 of FIG. 3A except for the above-described differences, the detailed description thereof will be omitted.

Figure 11:
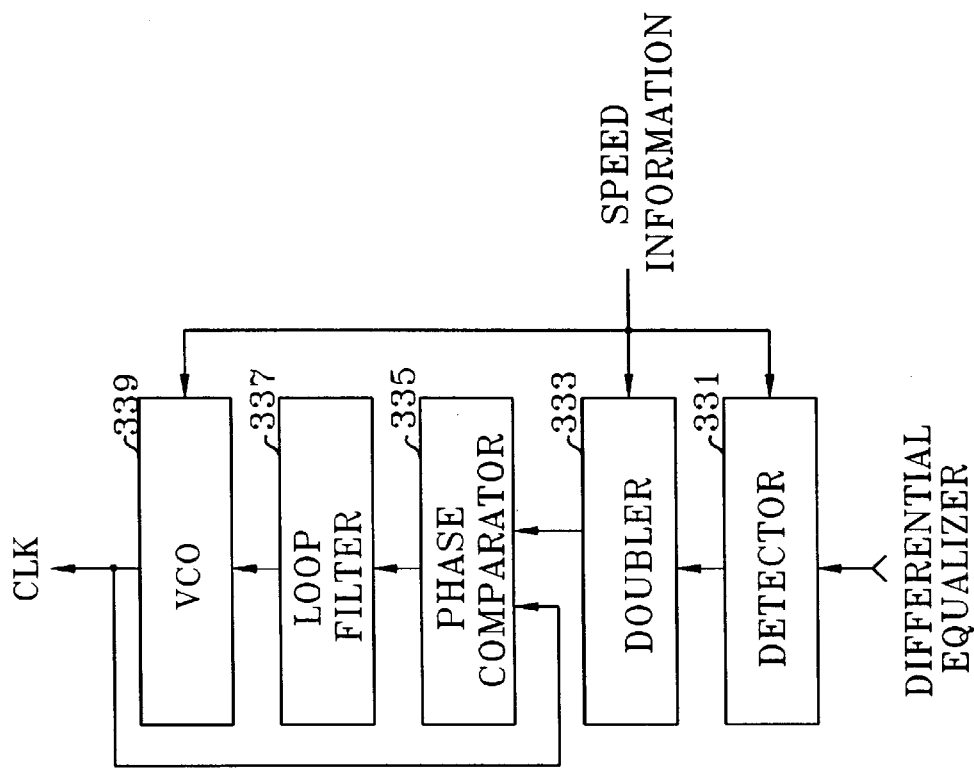
FIG. 11 is a detailed block diagram of a phase-locked-loop (PLL) of FIG. 8.
Figure 12B:
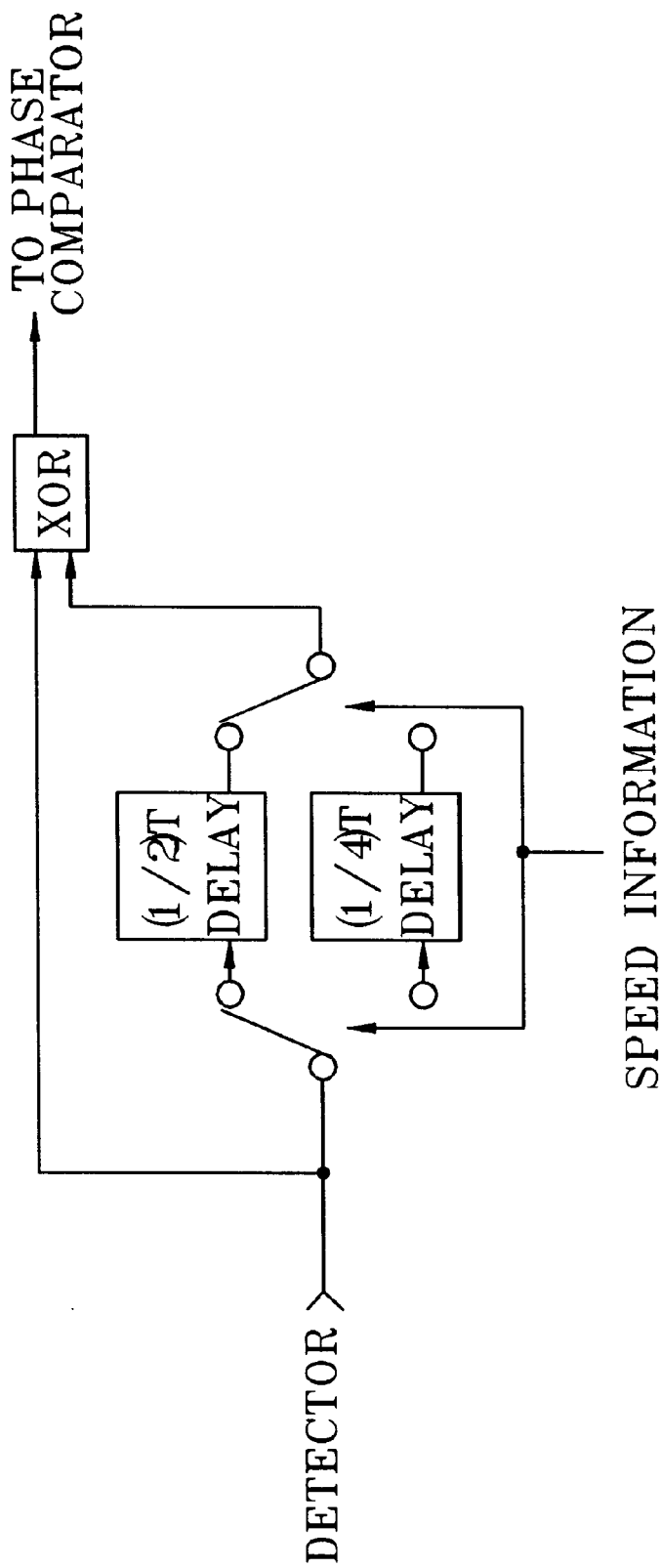

FIG. 11 is a detailed block diagram of a phase-locked-loop (PLL) 330 of FIG. 8. The PLL 330 is constituted to have the same components as those of a general PLL. That is, the PLL 330 includes a detector 331, a doubler 333 for obtaining a frequency twice that of an input signal, a phase comparator 335, a loop filter 337 and a voltage controlled controller (VCO) 339. The detailed constitution of the detector 331, the doubler 333 and the VCO 339 are shown in FIGS. 12A–12C. The detector 331, the doubler 333 and the VCO 339 shown in FIGS. 12A–12C have the same components as those of the existing blocks but further include resistors, capacitors and delays which are to be appropriate for the double speed duplication. Except for using additional circuits in case of the double speed duplication, they perform the same operations as those of the corresponding existing blocks except for the above differences. Thus, the detailed description thereof will be omitted.

It is apparent to one skilled in the art, who understands the apparatus described in FIGS. 4A–4B, that digital recording and reproducing apparatuses can be designed to duplicate at a rate N times faster based on the conditions described with reference to FIGS. 1 through 2E.

As described above, the digital recording and reproducing apparatus for high-speed duplication according to the present invention can reduce a duplication time and power consumption when duplicating multiple tapes from a source tape.

While only a certain embodiment of the invention has been specifically described herein, it will apparent that numerous modifications may be made thereto without departing from the spirit and scope of the invention.

What is claimed is:

1. A high speed digital recording and reproducing apparatus for duplicating a source tape to a target tape at a speed N times (N is an integer>1) faster than a normal speed duplication, wherein the normal speed duplication uses head drums having a diameter of $DD_O$, a tape surrounding angle of $WA_O$, and a rate of drum rotation $RPM_O$, the digital recording and reproducing apparatus comprises:

a reproducing head drum and a recording head drum having a diameter of $NXDD_O$ and using a surrounding angle of $WA_O/N$;

2N reproducing heads and 2N recording heads which are disposed on the reproducing and recording head drums, respectively;

signal processing means for processing signals and read from the reproducing heads to match the N-times high-speed duplication rate and for supplying the processed signal to the recording heads; and control means for transferring the source tape and target tape at N-times the normal tape speed, and for controlling the head drums to rotate at a rate of rotation $RPM_N$ which meets the condition:

$$RPM_N = (N \times DD_O \times RPM_O)/DD_N$$

where $DD_N$ is the diameter of the head drum used at N-times duplicating speed, wherein each of said 2N reproducing and recording heads are disposed on said respective head drums to be offset relative to the other 2N-1 heads, and wherein each of said heads is mounted opposite to another head on the head drum which enables two oppositely mounted heads on the head drum to record signals on two adjacent tracks of the tape.

2. The digital recording and reproducing apparatus according to claim 1, wherein said signal processing means comprises N substantially similar processing circuits which are connected in parallel to one another to process the signals from the reproducing heads and the recording heads.

3. The digital recording and reproducing apparatus according to claim 2, wherein said control means controls said N processing circuits to process the signals from respective reproducing heads and to supply information to respective recording heads.

* * * * *